US008202353B2

(12) United States Patent
Lee et al.

(10) Patent No.: US 8,202,353 B2
(45) Date of Patent: Jun. 19, 2012

(54) SEPARATION, PURIFICATION AND RECOVERY METHOD OF $SF_6$, HFCS AND PFCS

(75) Inventors: Gang Woo Lee, Busan (KR); Jae Jeong Lee, Busan (KR); Dong Hyun Moon, Ulsan (KR); Min Choul Kim, Busan (KR); Min Gwang Seok, Ulsan (KR); Ju Hyun Ko, Ulsan (KR); Hyung Joon Shin, Busan (KR); Young Seog Kim, Seoul (KR); Ju Dong Lee, Busan (KR); Man Sig Lee, Yangsan-si (KR)

(73) Assignee: Yoosung Co., Ltd., Ulsan (KR)

( * ) Notice: Subject to any disclaimer, the term of this patent is extended or adjusted under 35 U.S.C. 154(b) by 734 days.

(21) Appl. No.: 12/262,764

(22) Filed: Oct. 31, 2008

(65) Prior Publication Data

US 2009/0114096 A1    May 7, 2009

(30) Foreign Application Priority Data

Nov. 2, 2007  (KR) ........................ 10-2007-0111597
Oct. 22, 2008  (KR) ........................ 10-2008-0103431

(51) Int. Cl.
   *B01D 53/68*    (2006.01)
(52) U.S. Cl. ........................ 95/233; 423/240 R; 423/467
(58) Field of Classification Search .................... 95/233, 95/153–154; 423/240 R, 467
   See application file for complete search history.

(56) References Cited

U.S. PATENT DOCUMENTS

| | | | | |
|---|---|---|---|---|
| 3,907,522 | A * | 9/1975 | Tsukamoto et al. | ............. 95/210 |
| 4,399,113 | A * | 8/1983 | Tosaka et al. | .............. 423/240 R |
| 6,352,576 | B1 * | 3/2002 | Spencer et al. | .................. 95/236 |
| 6,759,564 | B2 * | 7/2004 | Max et al. | ...................... 588/320 |
| 6,862,535 | B2 * | 3/2005 | Binder | ........................... 702/24 |
| 7,008,544 | B2 * | 3/2006 | Max | .............................. 210/708 |
| 7,255,794 | B2 * | 8/2007 | Max et al. | ...................... 210/711 |
| 7,700,796 | B2 * | 4/2010 | Lewis et al. | ..................... 556/110 |
| 7,914,749 | B2 * | 3/2011 | Carstens et al. | .............. 422/198 |
| 2001/0052288 | A1 * | 12/2001 | Lee et al. | ......................... 95/173 |
| 2007/0248527 | A1 * | 10/2007 | Spencer | .................... 423/437.1 |
| 2009/0124520 | A1 * | 5/2009 | Tohidi | ............................. 507/90 |

OTHER PUBLICATIONS

"Surfactants as Hydrate Promoters?"—Ugur Karaaslan and Mahmut Parlaktuna, Energy & Fuels 2000, 14, 1103-1107.*
Karaaslan et al "Surfactants as Hydrate Promoters?" J. Energy & Fuels 2000, 14, 1103-1107.*

* cited by examiner

*Primary Examiner* — Duane Smith
*Assistant Examiner* — Ives Wu
(74) *Attorney, Agent, or Firm* — Michael A. Glenn; Glenn Patent Group

(57) ABSTRACT

A separation, purification and recovery method of $SF_6$, HFCs or PFCs is disclosed, which comprises a step for forming a gas hydrate including components in addition to $SF_6$, HFCs or PFCs. It is possible to separate and recover fluoro-gas at a much lower cost as compared to a conventional method for thereby obtaining an economical effect and preventing an emission of $SF_6$, HFCs or PFCs which corresponds to Non-$CO_2$ having a higher earth warming index, which leads to preventing an earth warming phenomenon. So, the present invention might be widely applied.

5 Claims, 5 Drawing Sheets

SEPARATION, PURIFICATION AND RECOVERY METHOD OF $SF_6$, HFCS AND PFCS

TECHNICAL FIELD

The present invention relates to a separation, purification and recovery method of $SF_6$, HFCs or PFCs, and in particular to a separation, purification and recovery method of $SF_6$, HFCs or PFCs through a solid/liquid separation after an intensive concentration in a gas hydrate state by reacting a gas such as $SF_6$, HFCs or PFCs with water.

BACKGROUND ART $SF_6$, HFCs or PFCs is known to have a higher earth warming index and a longer life span and is designated as six representative earth warming gases along with $CO_2$, $CH_4$ and $N_2O$. In particular, $SF_6$ has the highest earth warming impact level among six representative earth warming gases and has 23,900 times higher earth warming index as compared to $CO_2$ which is one of representative earth warming gases. So, $SF_6$ is the worst environment pollutant.

In addition, all countries including advanced countries as well as developing countries are included in the group for greenhouse gas emission cut countries after 2013 in accordance with the weather protocol which was adapted in the $13^{th}$ UNFCCC(United Nations Framework Convention on Climate Change) on Dec. 15, 2007. Korea will be a member of the duty reduction countries in 2013, so a greenhouse gas reduction should be implemented. It is urgent that an economic and efficient measure for a separation and recovery of $SF_6$, which causes a serious greenhouse gas effect, should be sought and set.

In a conventional method for a separation, purification and recovery of all kinds of gases including fluoro-gases of $SF_6$, HFCs and PFCs, all mixed gases are liquified and distilled depending on their boiling points and are used.

Since the liquification temperatures of gases are very low, there are a lot of difficulties for liquification, and a lot of energy is needed. So, a low energy consumption process is being developed in a process of separating a specific component from multi-component mixed gases.

For example, the US patent gazette 2002/0062734 discloses a method of separating nitrogen and $SF_6$ using a membrane separation method.

DISCLOSURE OF THE INVENTION

Accordingly, it is an object of the present invention to provide a new and efficient separation, purification and recovery method of $SF_6$, HFCs or PFCs.

To achieve the above objects, there is provided a separation, purification and recovery method of fluoro-gases such as $SF_6$, HFCs or PFCs for thereby separating and recovering after fluoro-gases are intensively concentrated in a gas hydrate state.

EFFECTS

Since fluoro-gases can be concentrated 100 times intensively by using a hydrate formation method and then can be separated in a gas hydrate state, it is possible to significantly reduce the consumption of energy as compared to a conventional representative liquification method for thereby more effectively coping with an international environment regulation by reducing the emission of Non-$CO_2$ greenhouse gas of $SF_6$, HFCs or PFCs which has about 24,000 times higher earth warming index as compared to $CO_2$.

MODES FOR CARRYING OUT THE INVENTION

The construction and embodiments of the present invention will be described with reference to the accompanying drawings.

Gas hydrate has a cavity in a 3D lattice structure formed as water molecular and hydrogen are coupled under a high pressure and low temperature condition. Gases are physically caught in the above cavity. The most known gas hydrate is methane hydrate. In case that hydrate is made by reacting methane with water, a relatively higher atmosphere of 20 bar is required at 4° C.

Figure 1:
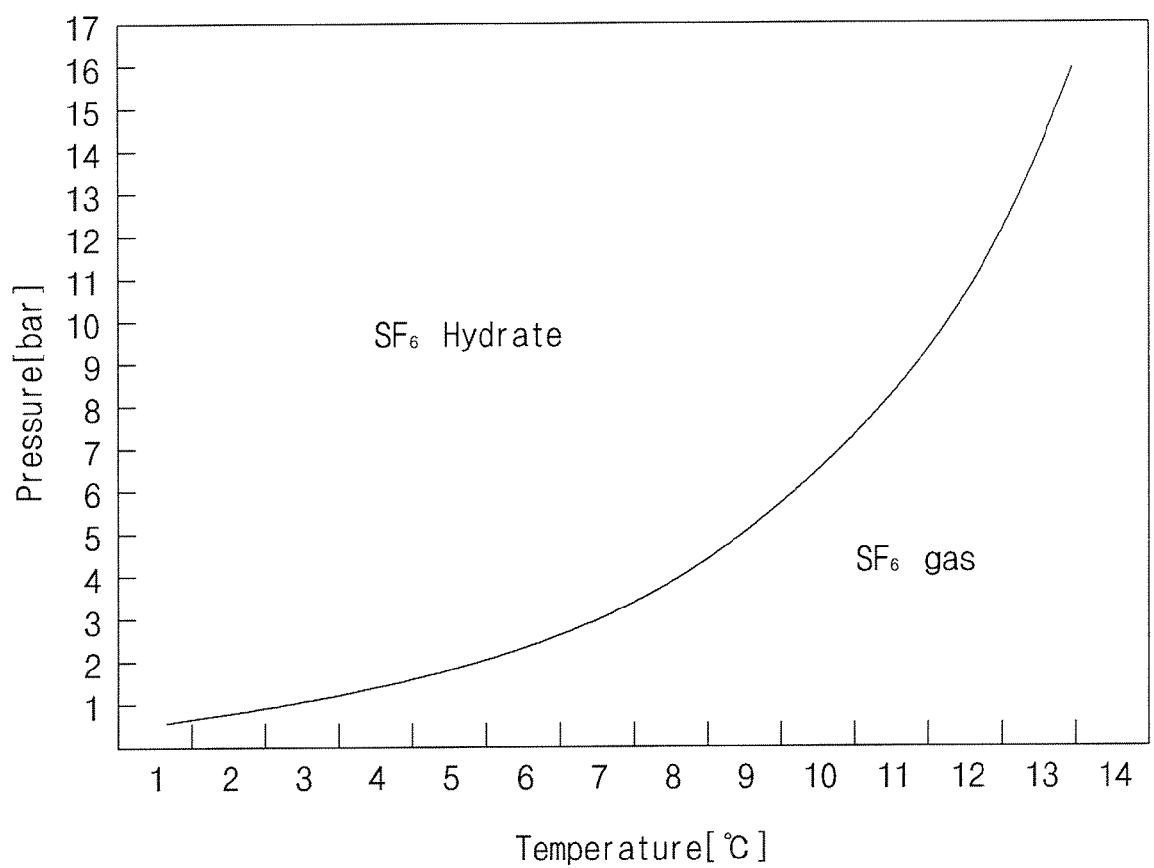
FIG. 1 is a view illustrating a hydrate phase of $SF_6$ gas according to the present invention.

However, in case of fluoro-gas to be separated according to the present invention, as shown in FIG. 1, the fluoro-gas can be easily crystallized under about 2.4 bar at 4° C and under 3.5 bar at a room temperature. The inventor of the present invention has separated and recovered the fluoro-gas in a hydrate state using the above condition.

For example, in case that a gas mixture including nitrogen and $SF_6$ at a molecular ratio of 7:3 is separated using a liquification method, a lot of energy is needed in a compression process. However, in case that it is separated using a hydrate formation principle, energy might be consumed at a cost of a heating control during a hydrate generation process, so cost might be down above 20% as compared to a liquification method, which leads to a very economical consumption.

In the present invention, an agitation process is performed using an impeller as a gas/liquid contact process so as to increase a contacting area between gas molecular and water molecular which are used in a reaction. In addition, micro liquid drops are sprayed using a micro liquid drop generation device, and hydrate is generated. As the size of each liquid drop decreases, a contacting area between water molecular and gas molecular increases with respect to a unit volume of gas, which leads to an innovative generation efficiency.

In addition, it is possible to more decrease an energy cost needed for a fluoro-gas separation recovery process with the helps of a gas hydrate formation speed promotion(Kinetic promotion) and a hydrate formation condition release(Thermodynamic promotion) by adding a nano size material which functions as a promoter during a hydrate formation process.

A nano size inorganic material stably dispersed in a host water induces and increases a concentration of gas in water by providing a gas adsorption site to a guest. In addition, the nano size inorganic material provides an environment that hydrates can concurrently grow in a cluster shape by providing a concurrent and multiple nucleus formation site due to a large specific surface area. Since a promoter having a higher thermal conductivity is able to effectively disperse latent heat during a formation of hydrate, it is expected to help a crystal growth of hydrate.

The above research and concept are first in the world. Namely, it is possible to achieve a kinetic promoter function, which promotes a hydrate formation, in combination with a guest concentration increase, a concurrent growth and an effective dispersion function of latent heat.

Figure 2:
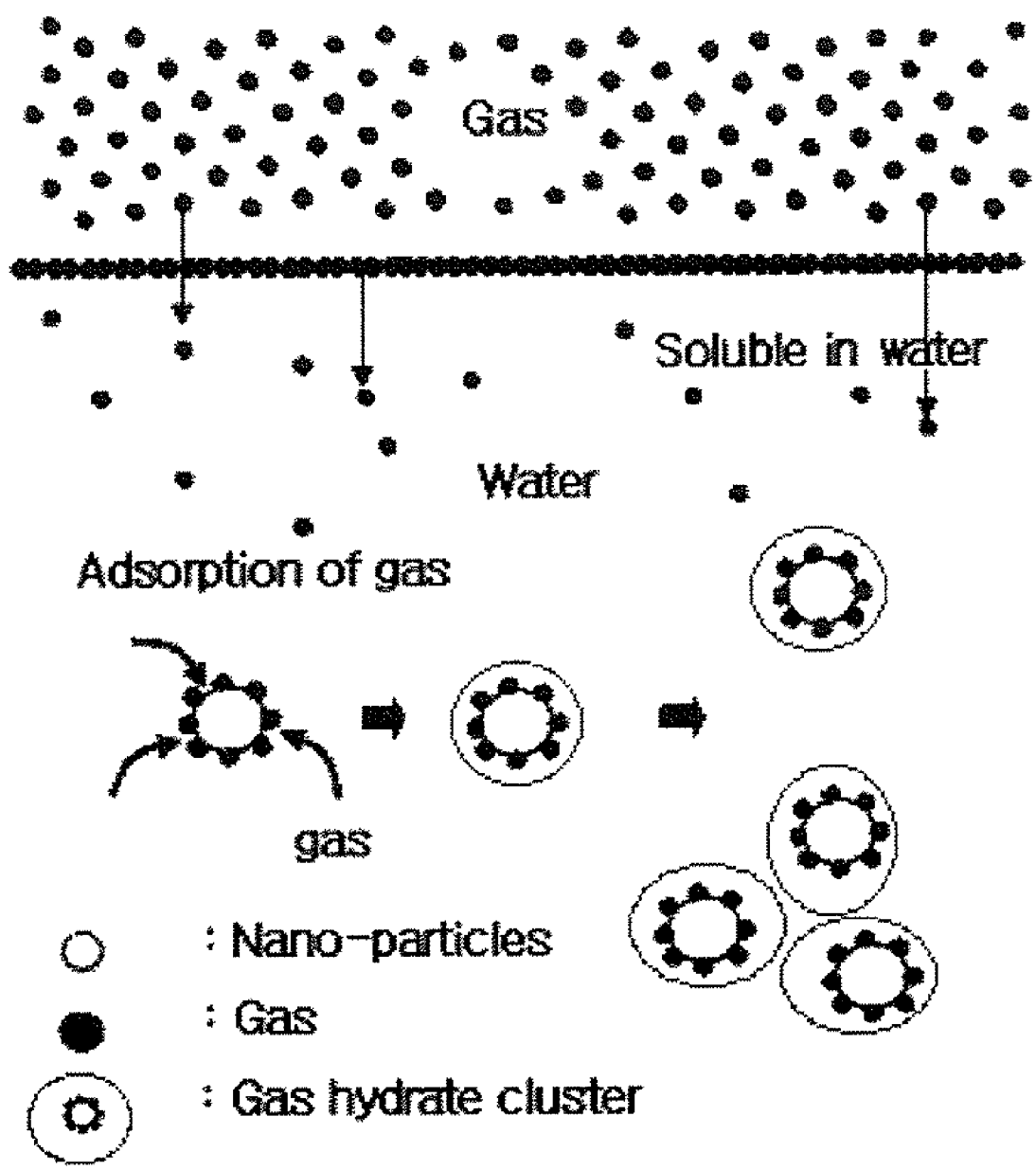
FIG. 2 is a view of a mechanism of a nano-size particle promoter according to the present invention.

As shown in FIG. 2, when a nano size promoter is used, a high intensive gas hydrate can be fast formed. Since a nano size particle has a large specific surface area, it can provide an adsorption site, and the density of a guest increases. Since it can be concurrently grown with the help of a nucleus formation site, a high intensive gas hydrate can be fast formed. A nano size particle such as a nano size carbon particle has a high heat conductivity, so it can disperse latent heat, which helps a crystal growth.

The present invention might be well understood along with the following embodiments, and it is obvious that the present invention might not be limited by means of the following embodiments and experiment examples.

Figure 3:
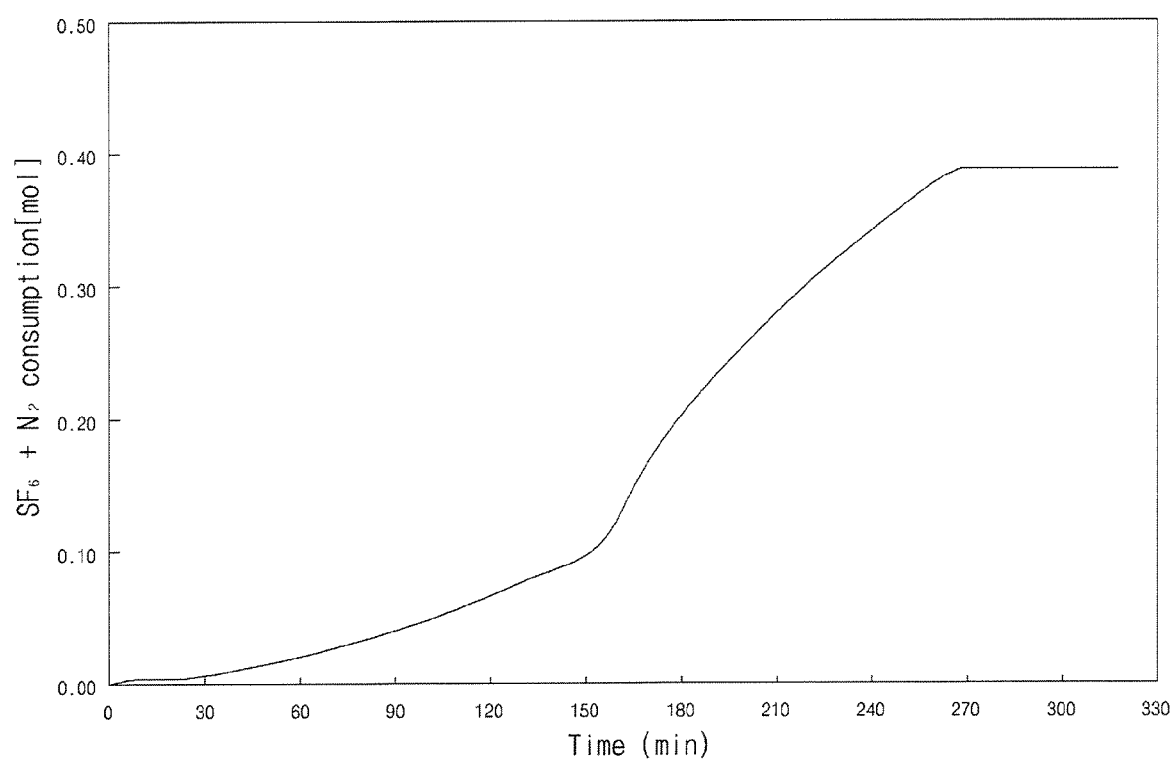
FIG. 3 is a $SF_6$ 50%($N_2$ Balance) hydrate formation ratio graph according to the present invention.
Figure 4:
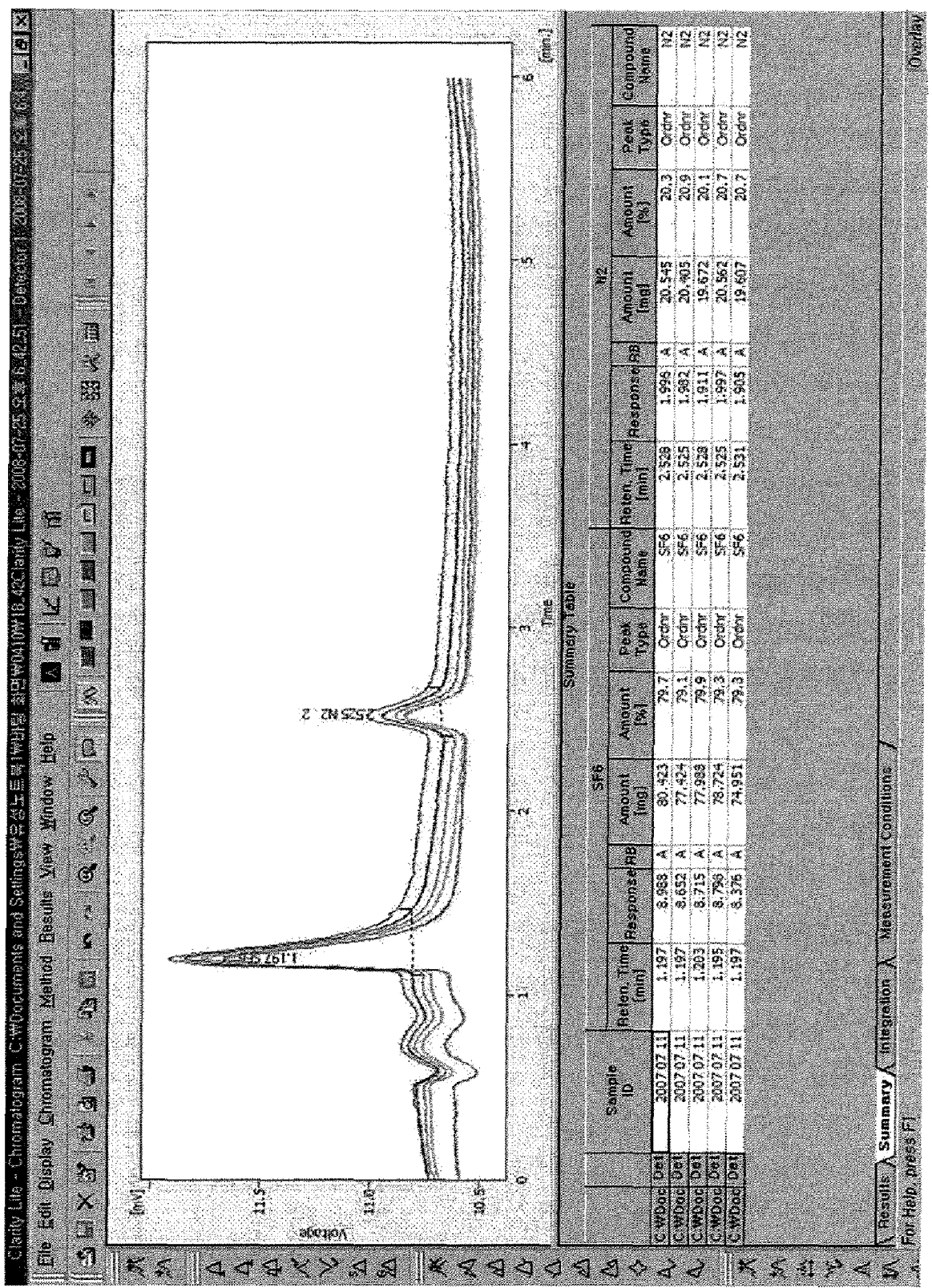
FIG. 4 is an analysis graph using a GC of a dissociation gas based on a dissociation of hydrate formed by using $SF_6$ 50% ($N_2$ Balance) according to the present invention.

[Embodiment 1]Separation, Purification and Recovery Ratio Experiment of $SF_6$ and Mixed Gas Pure water(HPLC grade, 99.999%) of 125 ml is injected into a reactor, and the interior of the reactor is purged a few times by using a $SF_6$ 50%($N_2$ Balance) gas. The hydrate is formed at a pressure of 7.8 bar, a temperature of 276K, and an agitating speed of 500 rpm. The reactor is substantially cooled to a low temperature after the hydrate formation reaction is completed, and $SF_6+N_2$ gas, which is not changed to hydrate, is discharged from the interior of the reactor to the outside. The interior of the reactor containing only hydrate is set at a pressure of 7 bar and a temperature of 293 K, so the hydrate is dissociated. The Quantitative and Qualitative Analysis is performed using GC((Varian CP3800 Gas Chromatograph, TCD) with respect to the dissociated gas. FIGS. 3 and 4 show a result of the above experiment, respectively.

[Embodiment 2]Effect Comparison Experiment by Promoter

Figure 5:
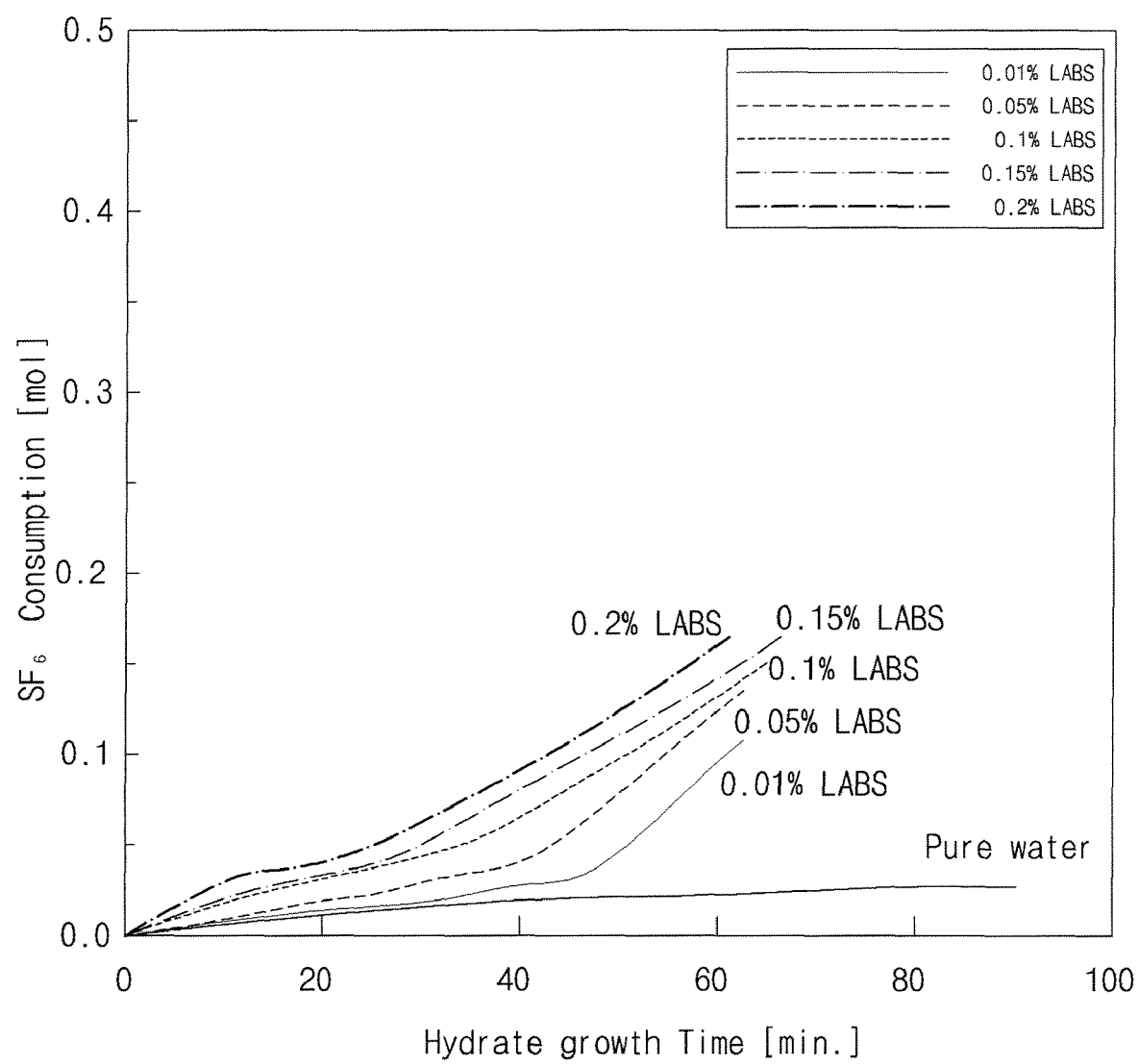
FIG. 5 is a graph of a result of a $SF_6$ hydrate kinetic experiment based on an addition concentration by using Linear Alkyl Benzene Sulfonate, LABS, Aldrich as gas hydrate promoter according to the present invention.

Pure water(HPLC grade, 99.999%) of 125 ml is injected into a reactor, and the interior of the reactor is purged using $SF_6$ of 99.99%, and the hydrate formation speed is analyzed by setting a pressure of 7.8 bar and a temperature of 276K. FIG. 5 shows a result of the above experiment.

[Embodiment 3]Effect Experiment of LABS Promoter

Aqueous solution including Linear Alkyl Benzene Sulfonate, LABS, Aldrich is prepared depending on concentrations and is substantially mixed and melt in water. 125 ml of LABS aqueous solution prepared by concentrations is injected into the reactor same as the embodiment 2, and the interior of the reactor is purged using $SF_6$ of 99.9%, and the $SF_6$ hydrate formation speed is analyzed based on the time by setting a pressure of 7.8 bar and a temperature of 276K. FIG. 5 shows a result of the above experiment.

As shown in FIGS. 3 and 4, as a result of the analysis of gas obtained through a hydrate formation dissociation using $SF_6$ of 50% ($N_2$ Balance) gas, a composition of $SF_6$ is about 80%, and a composition of $N_2$ is about 20%. Namely, it is known that a separation, purification and recovery of $SF_6$ and HFCs can be performed through the experiment of the present invention.

As shown in FIG. 5, when $SF_6$ hydrate is formed with pure water(HPLC grade, 99.999%), even when time is passed, a consumption amount of $SF_6$, namely, a production amount of $SF_6$ hydrate is below 0.02 mol, and its formation speed is very slow. When anion such as Linear Alkyl Benzene Sulfonate, LABS, Aldrich is added as a promoter, a consumption amount of $SF_6$, namely, a production amount of $SF_6$ hydrate proportionally increases depending on the lapse of time even though there is a certain difference depending on concentrations. Namely, it is possible to form a $SF_6$ hydrate with a high efficiency and high concentration through an experiment according to the present invention.

As described above, $SF_6$, HFCs or PFCs are greenhouse gases. Even when 10% of the total emission amount of $SF_6$ in Korea is separated, purified and recovered, it is possible to advantageously save an environmental cost of above 150 billion won, which leads to great cost saving effects.

The separation, purification and recovery method of $SF_6$, HFCs or PFCs might be applied for recovering a greenhouse gas for preventing an earth warming phenomenon and separating and recovering $SF_6$, HFCs or PFCs from other mixed gases.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A separation, purification and recovery method of fluoro-gas wherein a gas hydrate is formed, separated, purified and recovered by reacting a fluoro-gas with water in a gas mixture containing a fluoro-gas, in the presence of a nano-sized inorganic promoter to enhance hydrate formation speed and separation/purification efficiency.

2. The method of claim 1, wherein said flouro-gas is SF6 (Hexaflourosulfide), HFCs (Hydro fluorocarbons) or PFCs (Perfluorocarbons).

3. The method of claim 1, wherein said hydrate of fluoro-gas is formed at a temperature of −15° C. through 25° C.

4. The method of claim 1, wherein said hydrate of a fluoro-gas is formed at a pressure of 1 bar through 25 bar.

5. The method of claim 1, wherein said inorganic promoter comprises carbon particles.

* * * * *